(12) United States Patent
Liang et al.

(10) Patent No.: US 8,933,770 B2
(45) Date of Patent: Jan. 13, 2015

(54) ELECTRONIC DEVICE WITH MAGNET

(71) Applicants: Wei-Kuang Liang, New Taipei (TW); Chun Tang, Shenzhen (CN)

(72) Inventors: Wei-Kuang Liang, New Taipei (TW); Chun Tang, Shenzhen (CN)

(73) Assignee: ScienBiziP Consulting (Shenzhen) Co., Ltd., Guangdong (CN)

( * ) Notice: Subject to any disclaimer, the term of this patent is extended or adjusted under 35 U.S.C. 154(b) by 114 days.

(21) Appl. No.: 13/626,981

(22) Filed: Sep. 26, 2012

(65) Prior Publication Data

US 2013/0163157 A1 Jun. 27, 2013

(30) Foreign Application Priority Data

Dec. 26, 2011 (CN) .......................... 2011 1 0441192

(51) Int. Cl.
*G06F 1/16* (2006.01)
*H05K 5/00* (2006.01)
*H05K 7/00* (2006.01)
*H01F 7/00* (2006.01)
*H01F 1/00* (2006.01)

(52) U.S. Cl.
USPC ..................................... 335/219; 361/679.55

(58) Field of Classification Search
CPC .................................................. G06F 1/1616
USPC ....................................... 335/219; 361/679.55
See application file for complete search history.

(56) References Cited

U.S. PATENT DOCUMENTS

| | | | |
|---|---|---|---|
| 3,122,684 A * | 2/1964 | Genin ............................ 335/285 |
| 3,598,900 A * | 8/1971 | Drake ......................... 174/138 F |
| 5,301,822 A * | 4/1994 | Coleman et al. ............. 211/70.6 |
| 5,367,278 A * | 11/1994 | Yoshikawa ..................... 335/285 |
| 5,880,661 A * | 3/1999 | Davidson et al. ............. 335/306 |
| 6,366,440 B1 * | 4/2002 | Kung ............................. 361/147 |
| 6,902,214 B2 * | 6/2005 | Smith ......................... 292/251.5 |
| 7,277,277 B2 * | 10/2007 | Bang ......................... 361/679.55 |
| 7,775,567 B2 * | 8/2010 | Ligtenberg et al. ......... 292/251.5 |
| 7,889,036 B2 * | 2/2011 | Fiedler .......................... 335/306 |
| 8,050,030 B2 * | 11/2011 | Wu et al. .................... 361/679.58 |
| 8,111,120 B2 * | 2/2012 | Chang et al. .................. 335/219 |
| 8,187,006 B2 * | 5/2012 | Rudisill et al. .................. 439/39 |
| 8,199,525 B2 * | 6/2012 | Bohnen et al. ................ 361/801 |
| 8,570,126 B1 * | 10/2013 | Lee et al. ...................... 335/205 |
| 8,587,396 B2 * | 11/2013 | Liang et al. ................... 335/205 |
| 2002/0017793 A1 * | 2/2002 | Spiessl ..................... 292/341.16 |
| 2004/0190239 A1 * | 9/2004 | Weng et al. .................... 361/683 |
| 2006/0087128 A1 * | 4/2006 | Salice ............................ 292/163 |
| 2009/0273906 A1 * | 11/2009 | Bohnen et al. ................ 361/747 |
| 2010/0270817 A1 * | 10/2010 | Yu .............................. 292/251.5 |
| 2012/0242093 A1 * | 9/2012 | Liang et al. ..................... 292/96 |
| 2012/0242094 A1 * | 9/2012 | Liang et al. .................... 292/117 |
| 2012/0268902 A1 * | 10/2012 | Liang et al. ................... 361/747 |
| 2012/0287595 A1 * | 11/2012 | Liang et al. ................... 361/810 |

* cited by examiner

*Primary Examiner* — Alexander Talpalatski
(74) *Attorney, Agent, or Firm* — Novak Druce Connolly Bove + Quigg LLP

(57) ABSTRACT

An electronic device includes a frame and a magnet. The frame includes a main frame body, a stopping piece, a blocking piece, and a hook. The stopping piece and the blocking piece protrude from the main frame body. The hook is located on the blocking piece facing the main frame body. The main frame body, the stopping piece, and the blocking piece cooperatively define a receiving space. The magnet is engaged in the receiving space, and the hook is engaged with the magnet for preventing the magnet from disengaging from the receiving space.

7 Claims, 5 Drawing Sheets

ELECTRONIC DEVICE WITH MAGNET

BACKGROUND

1. Technical Field

The present disclosure relates to electronic devices, and particularly to an electronic device with a magnet.

2. Description of Related Art

A notebook computer includes a frame configured to receive a display monitor (such as LCD monitor) and a magnet for the notebook computer to hibernate when the display monitor is closed. A conventional mounting way to mount the magnet is to melt the magnet on the fame under a high temperature, about 200 centigrade to 250 centigrade. A gauss value of the magnet may be influenced by the high temperature so that the notebook computer cannot hibernate normally.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
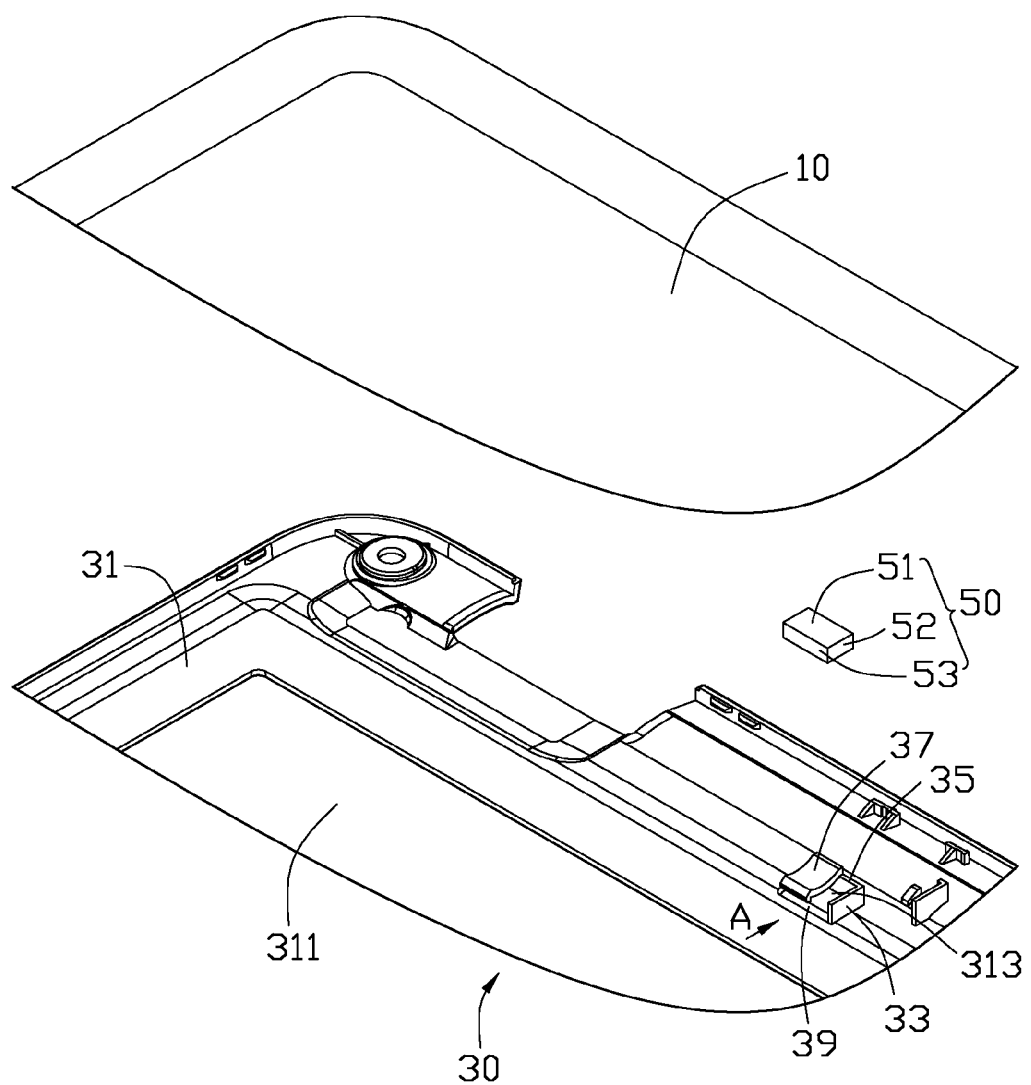
FIG. 1 is an exploded, isometric view of an embodiment of an electronic device.
Figure 2:
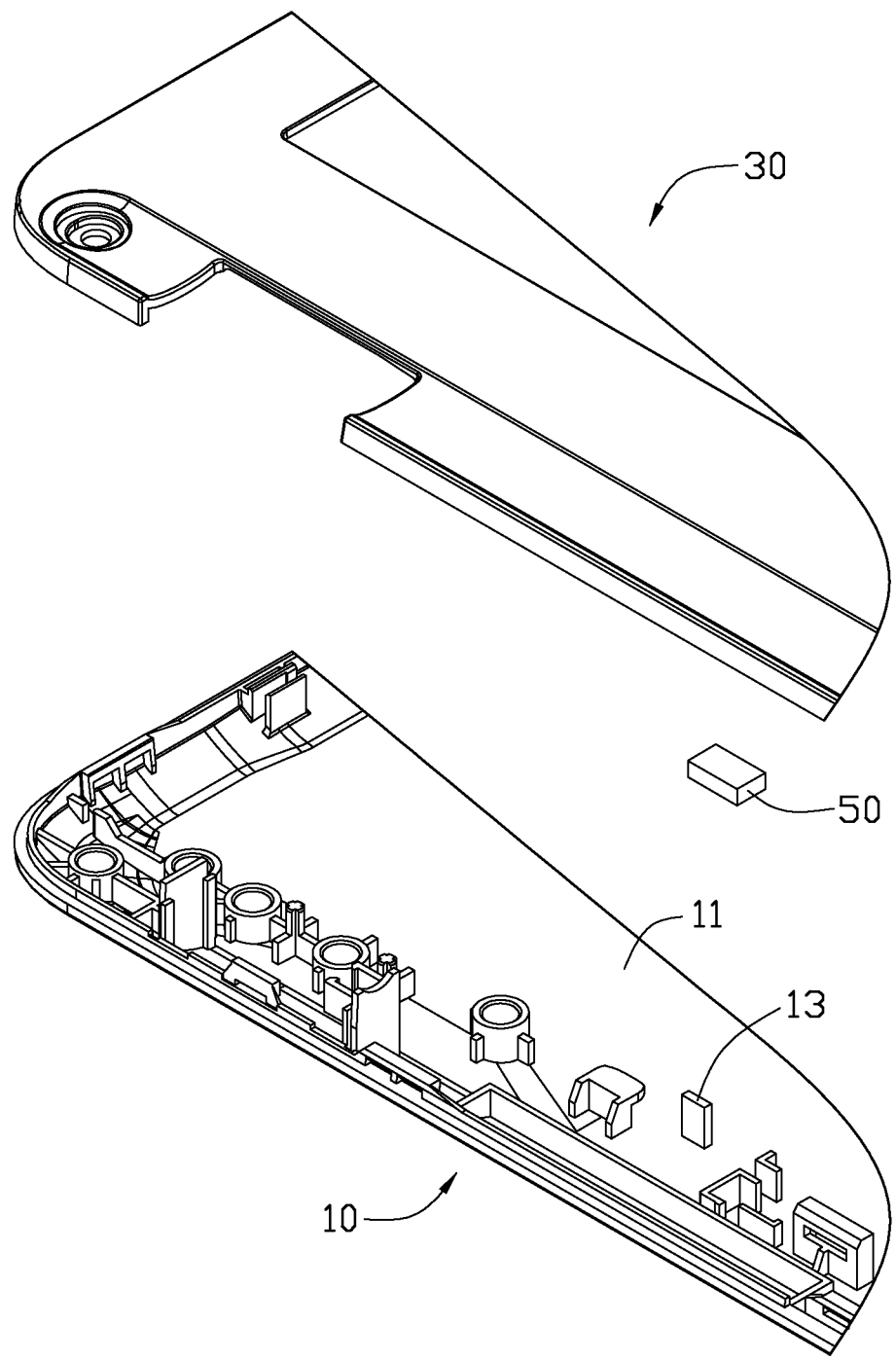
FIG. 2 is similar to FIG. 1, but viewed from a different aspect.

FIGS. 1-2 show an electronic device in accordance with an embodiment. The electronic device includes a cover plate 10, a frame 30, and a magnet 50 attached to the frame 30. In some embodiments, the electronic device may be a notebook computer, and the magnet 50 is configured to make the notebook computer go into stand by mode.

The cover plate 10 includes a main plate 11. The main plate 11 is substantially rectangular, for example. A positioning piece 13 protrudes from the main plate 11. The positioning piece 13 is substantially perpendicular to the main plate 11.

The frame 30 includes a main frame body 31. To receive a display monitor, an opening 311 is defined in the main frame body 31. The display monitor is liquid crystal display (LCD), for example. The main frame body 31 is substantially rectangular, for example. A stopping piece 33 is located on an outer surface of the main frame body 31. The stopping piece 33 is substantially perpendicular to the main frame body 31. A blocking piece 35 is located on the outer surface of the main frame body 31, and one end of the blocking piece 35 is connected to one end of the stopping piece 33. The blocking piece 35 is substantially perpendicular to the stopping piece 33 and the main frame body 31. A hook 37 is located on the blocking piece 35 facing the main frame body 31. The hook 37 includes a resilient portion 371 and a latching portion 373 connected to the resilient portion 371. The resilient portion 371 extends from an edge of the stopping piece 33 and includes a limiting tab 3711 (shown in FIG. 5). The limiting tab 3711 is substantially arc-shaped and protrudes towards the main frame body 31. The main frame body 31, the stopping piece 33, and the blocking piece 35 cooperatively define a receiving space 313 for receiving the magnet 50. An elongated railing 39 protrudes from the main frame body 31 and is located on one side of the stopping piece 33, which faces the blocking piece 35.

The magnet 50 includes two opposite first surfaces 51, two opposite second surfaces 52 and two opposite third surfaces 53. The magnet 50 is, for example, substantially cuboid.

Figure 3:
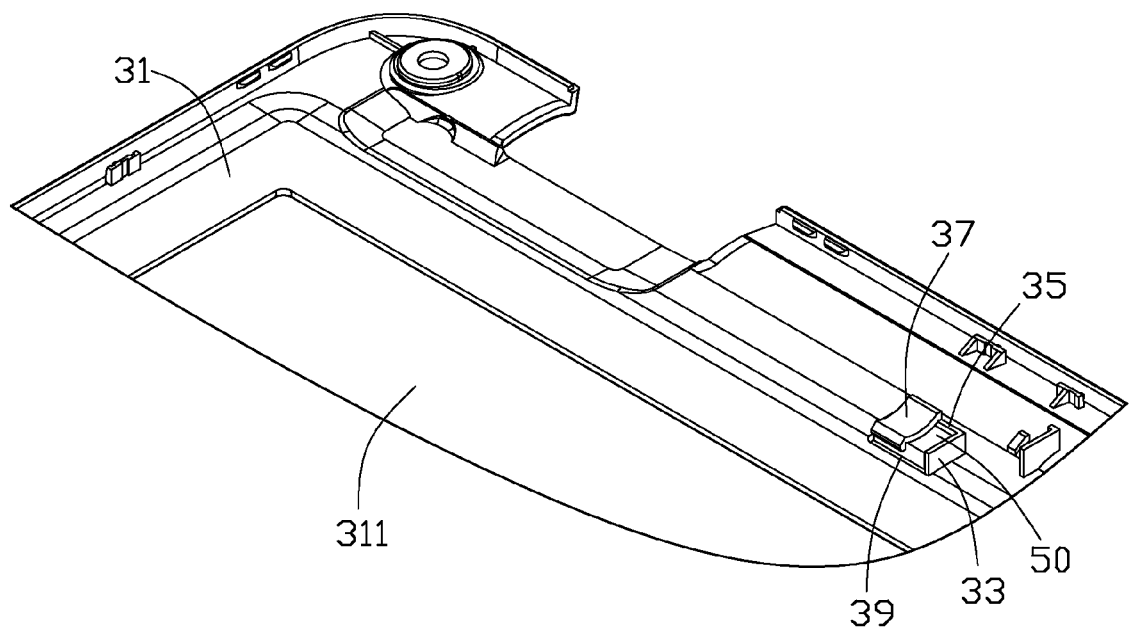
FIG. 3 is an assembled, cutaway view of a frame and a magnet of FIG. 1.

Referring to FIG. 3, during installation, the magnet 50 is placed at one side of the railing 39. An acting force is applied to the hook 37 to pull the latching portion 373 away from the receiving space 313. The magnet 50 is pulled towards the receiving space 313, until the magnet 50 is received in the receiving space 313. The hook 37 is released and the resilient portion 371 elastically rebounds to engage the latching portion 373 with the magnet 50. The two first surfaces 51 of the magnet 50 are engaged between the main frame body 31 and the resilient portion 371 for preventing the magnet from moving along a first direction perpendicular to the main frame body 31. The two second surfaces 52 of the magnet 50 are engaged between the stopping piece 33 and the limiting tab 3711 for preventing the magnet from moving along a second direction perpendicular to the first direction and the stopping piece 33. The two third surfaces 53 of the magnet 50 are engaged between the latching portion 373 and the blocking piece 35 for preventing the magnet 50 from moving along a third direction perpendicular to the first direction and the second direction.

Figure 4:
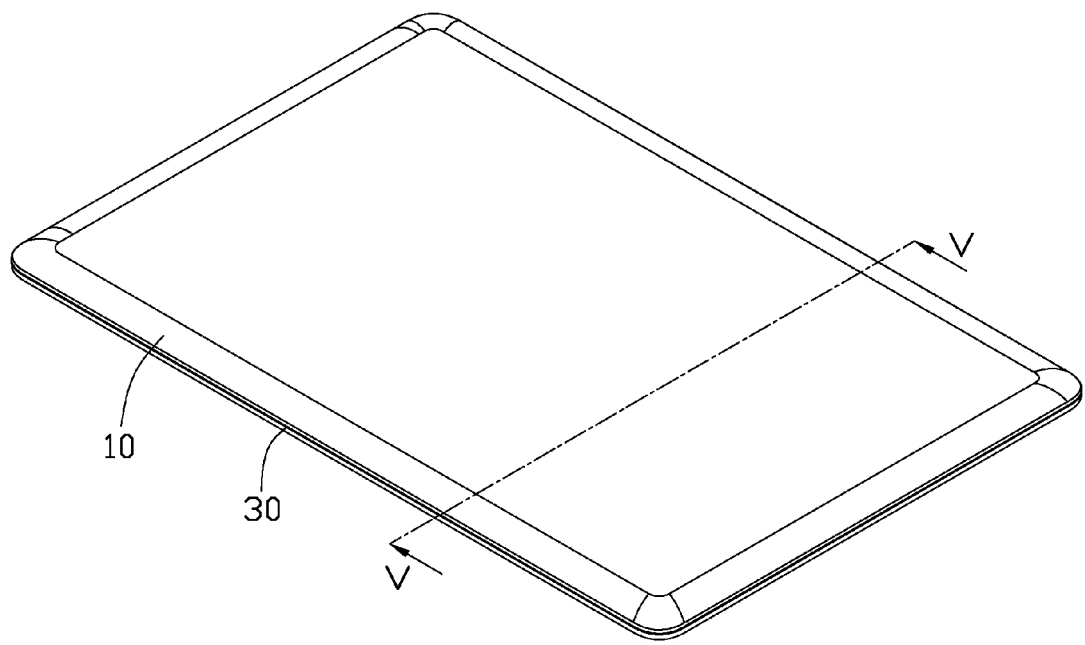
FIG. 4 is an assembled view of the electronic device of FIG. 1.
Figure 5:
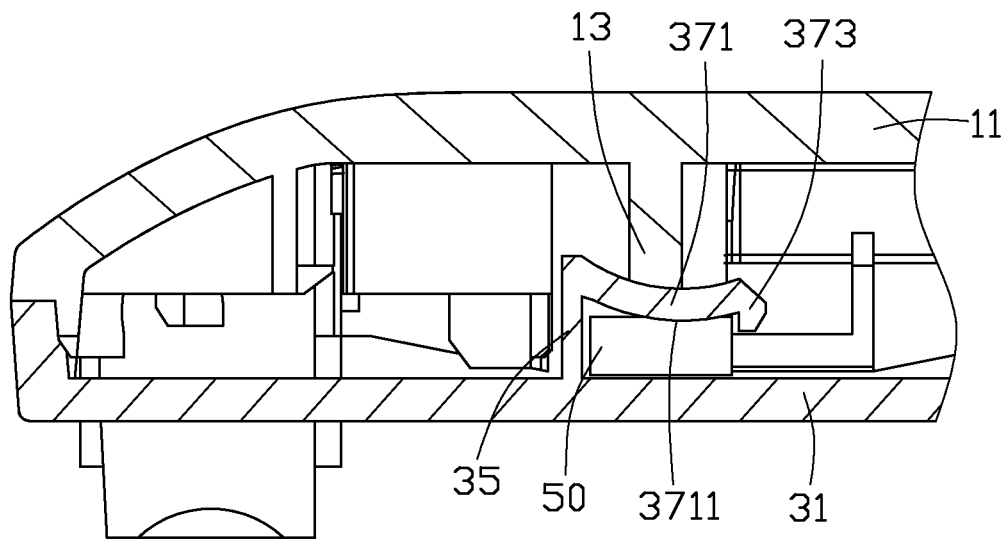
FIG. 5 is a cross-sectional view of FIG. 4, taken along the line V-V.

Referring to FIGS. 4-5, the cover plate 10 is secured the frame 30 by screws for example. The positioning piece 13 abuts the resilient portion 371 of the hook 37 from preventing the magnet 50 from disengaging from the receiving space 313.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. An electronic device comprising:

a frame, the frame comprising a main frame body, a stopping piece, a blocking piece, and a hook; the stopping piece and the blocking piece protruding from the main frame body; the hook being on the blocking piece facing the main frame body and comprising a limiting tab parallel to the stopping piece, the limiting tab being arc-shaped; the main frame body, the stopping piece, and the blocking piece cooperatively defining a receiving space; and a magnet engaged in the receiving space, the hook being engaged with the magnet the limiting tab abutting the magnet to prevent the magnet from disengaging from the receiving space;

the hook comprises a resilient portion located on the blocking piece, and the limiting tab extends from the resilient portion, the magnet comprises two first surfaces, and the resilient portion is resiliently deformable to engage the two first surfaces between the resilient portion and the main frame body, to prevent the magnet from moving along a first direction that is perpendicular to the main frame body; and an elongated railing protrudes from the main frame body towards the blocking piece, the hook further comprises a latching portion located on resilient portion, the magnet further comprises two third surfaces, and the two third surfaces are engaged among the latching portion, the elongated railing, and the blocking piece.

2. The electronic device of claim 1 further comprises a cover plate, wherein the cover plate is secured to the frame and comprises a positioning piece, and the positioning piece abuts the hook.

3. The electronic device of claim 2, wherein the positioning piece is substantially perpendicular to the main frame body.

4. An electronic device comprising:
a frame, the frame comprising a main frame body and a hook located on the main frame body the main frame body defining a receiving space;
a magnet engaged in the receiving space; and
a cover plate secured to the frame and comprising a main plate, a positioning piece extending from the main plate and being substantially perpendicular to the main frame body and the main plate,
wherein the hook is engaged with the magnet, to prevent the magnet from disengaging from the receiving space, and the positioning piece abuts the hook and is located between the hook and the main plate, to prevent the hook from being resiliently deformed;

the main frame body comprises a stopping piece and a blocking piece connected to the stopping piece, the stopping piece, the blocking piece and the main frame body cooperatively define the receiving space;

the stopping piece is substantially perpendicular to the main frame body, the blocking piece is substantially perpendicular to the main frame body, and the stopping piece is substantially perpendicular to the blocking piece;

the hook comprises a resilient portion located on the blocking piece, the magnet comprises two first surfaces, and the resilient portion is resiliently deformable to engage the two first surfaces are engaged between the resilient portion and the main frame body, to prevent the magnet from moving along a first direction that is perpendicular to the main frame body;

the hook further comprises a limiting tab extending from the resilient portion, the magnet further comprises two second surfaces, and the two second surfaces are engaged between the limiting tab and the stopping piece, to prevent the magnet from moving along a second direction that is perpendicular to the first direction.

5. The electronic device of claim 4, wherein an elongated railing protrudes from the main frame body towards the blocking piece, the hook further comprises a latching portion located on resilient portion, the magnet further comprises two third surfaces, and the two third surfaces are engaged among the latching portion, the elongated railing, and the blocking piece.

6. The electronic device of claim 5, wherein the limiting tab is substantially arc-shaped and parallel to the stopping piece.

7. The electronic device of claim 6, the positioning piece is substantially parallel to the blocking piece and is perpendicular to the stopping piece.

* * * * *